United States Patent [19]

Newby, Sr.

[11] Patent Number: 4,662,515

[45] Date of Patent: May 5, 1987

[54] PLASTIC BLOW-MOLDED ARTICLES WITH FOLD-UP SIDES

[75] Inventor: John P. Newby, Sr., Wake County, N.C.

[73] Assignee: Southern Case, Inc., Raleigh, N.C.

[21] Appl. No.: 840,775

[22] Filed: Mar. 18, 1986

[51] Int. Cl.[4] .......................... B65D 6/12; B65D 6/16
[52] U.S. Cl. .................................... 206/349; 220/4 F; 220/6; 312/258; 312/257 A; 312/DIG. 33
[58] Field of Search ............ 220/6, 4 F; 312/257 SM, 312/DIG. 33, 257 R, 257 SK, 258, 257 A, 261; 206/349

[56] References Cited

U.S. PATENT DOCUMENTS

| | | | |
|---|---|---|---|
| 3,246,828 | 4/1966 | Branscum et al. | 220/6 |
| 3,360,180 | 12/1967 | Venturi | 220/6 |
| 3,497,127 | 2/1970 | Box | 220/6 |
| 4,057,165 | 11/1977 | Kardell | 220/6 |
| 4,170,313 | 10/1979 | Caves et al. | 220/6 |
| 4,235,346 | 11/1980 | Liggett | 220/6 |
| 4,591,065 | 5/1986 | Foy | 220/6 |

*Primary Examiner*—Joseph Man-Fu Moy
*Attorney, Agent, or Firm*—Bell, Seltzer, Park & Gibson

[57] ABSTRACT

The plastic blow-molded container of the present invention is illustrated in the form of a tool chest including a lower tool compartment that is initially blow molded in a flat condition with side walls being simultaneously molded with and joined to a bottom wall by integral flexible plastic hinges so that the side walls can be raised up into right angular relationship with the bottom wall. The simultaneous blow molding of the walls of the compartment in flat condition with the bottom wall permits the integral formation of drawer supporting ribs extending inwardly from the side walls and also permits the formation of a compartment having a greater depth than has been possible in known types of unitary one-piece blow-molded containers. Support ledges are integrally formed on the interior walls and adjacent the living hinges so that the side and rear walls are rigidly supported on the support ledges when the rear and side walls are raised up into right angular relationship with the bottom wall. The living hinges are not required to support any weight or force applied to the side and rear walls but merely act to maintain the side and rear walls in alignment above the peripheral edge portions of the bottom wall.

21 Claims, 19 Drawing Figures

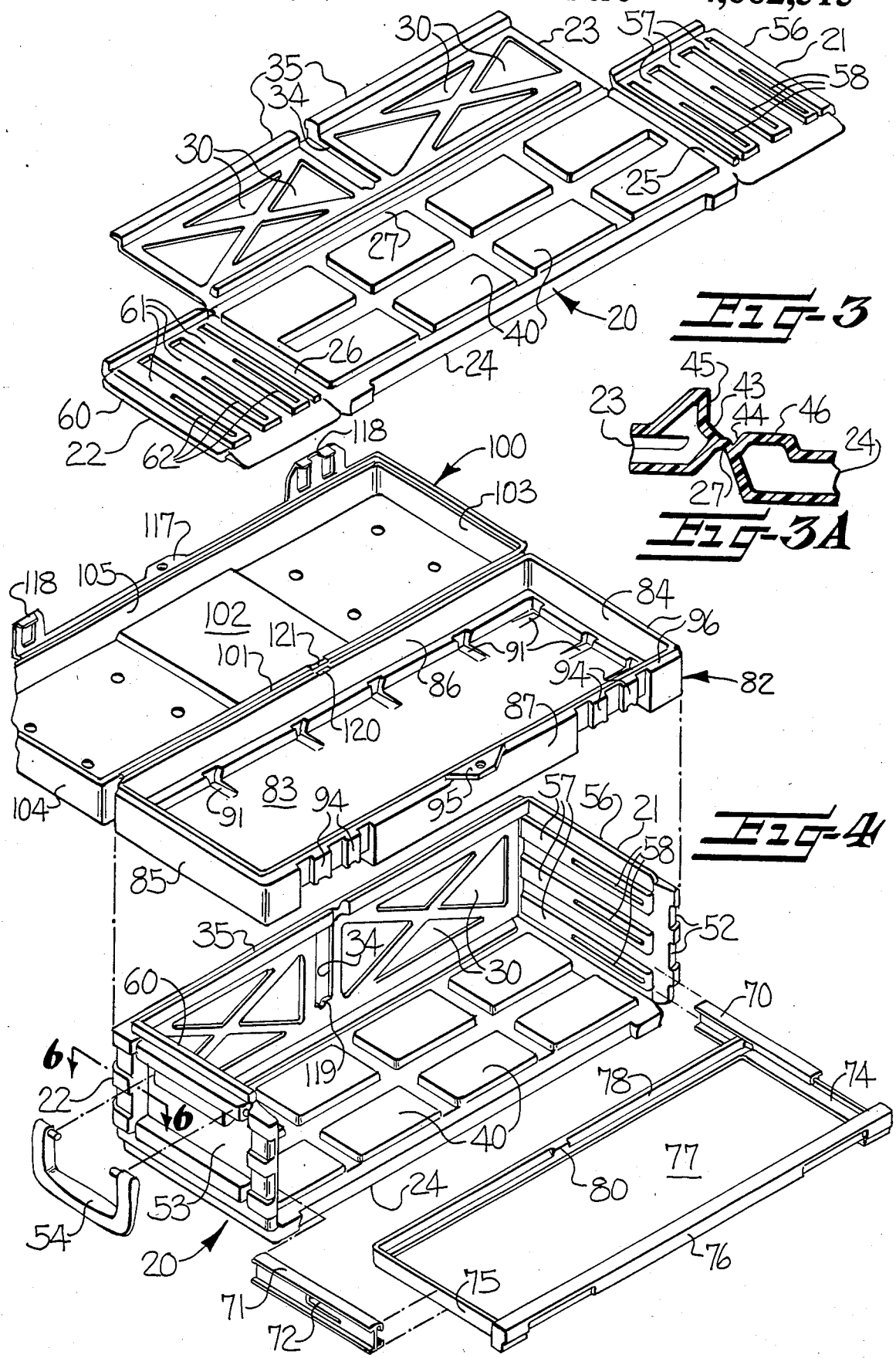

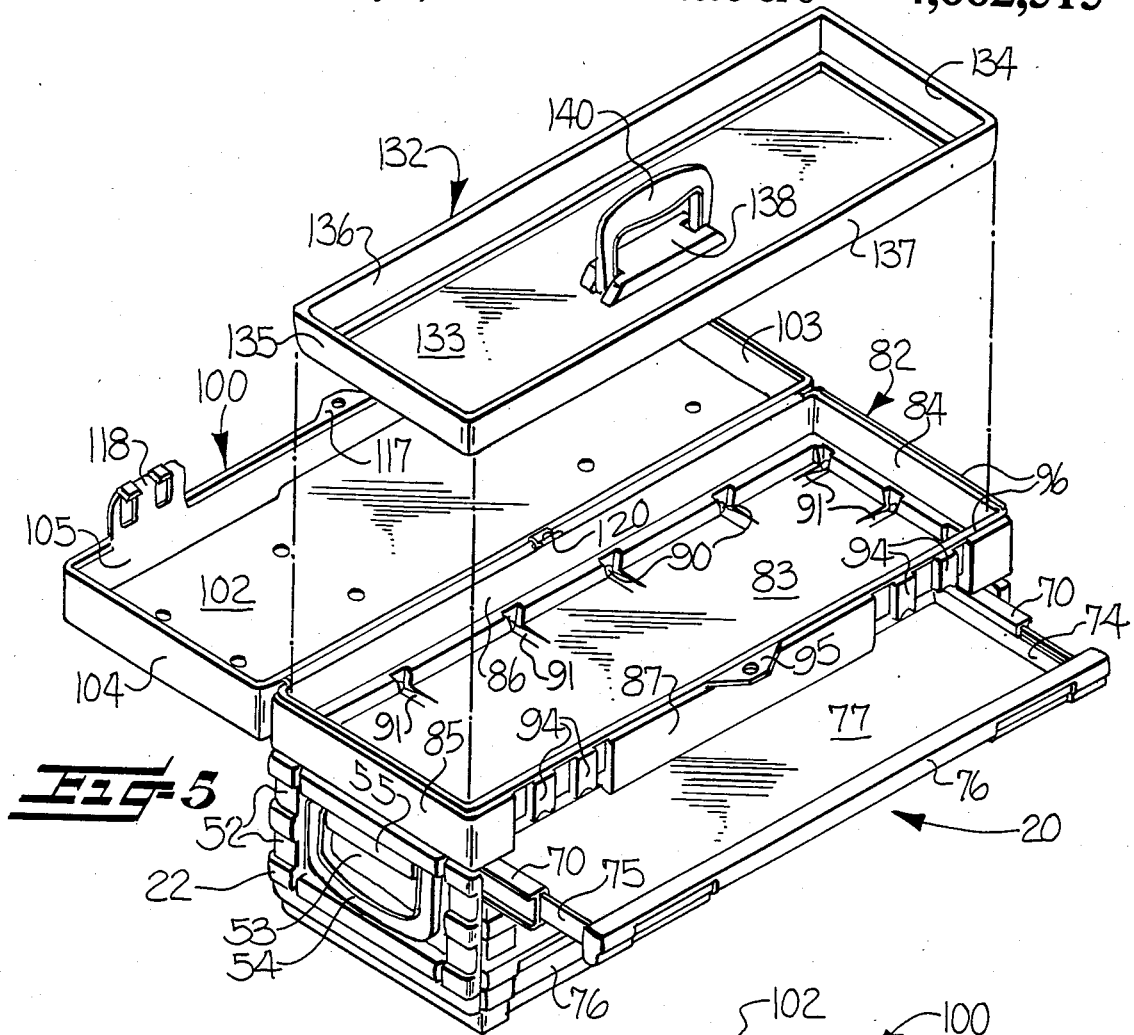
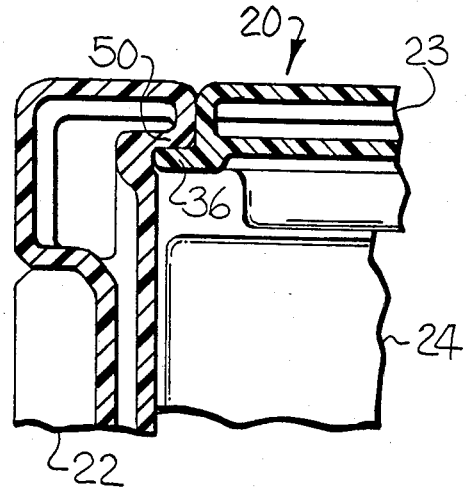
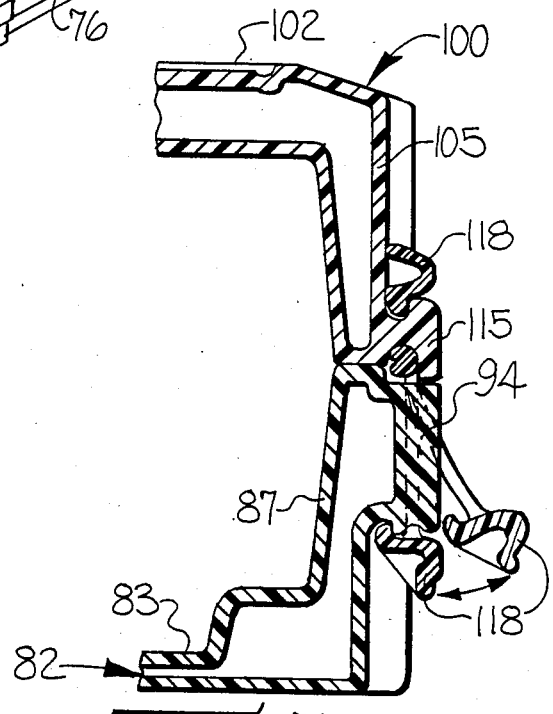

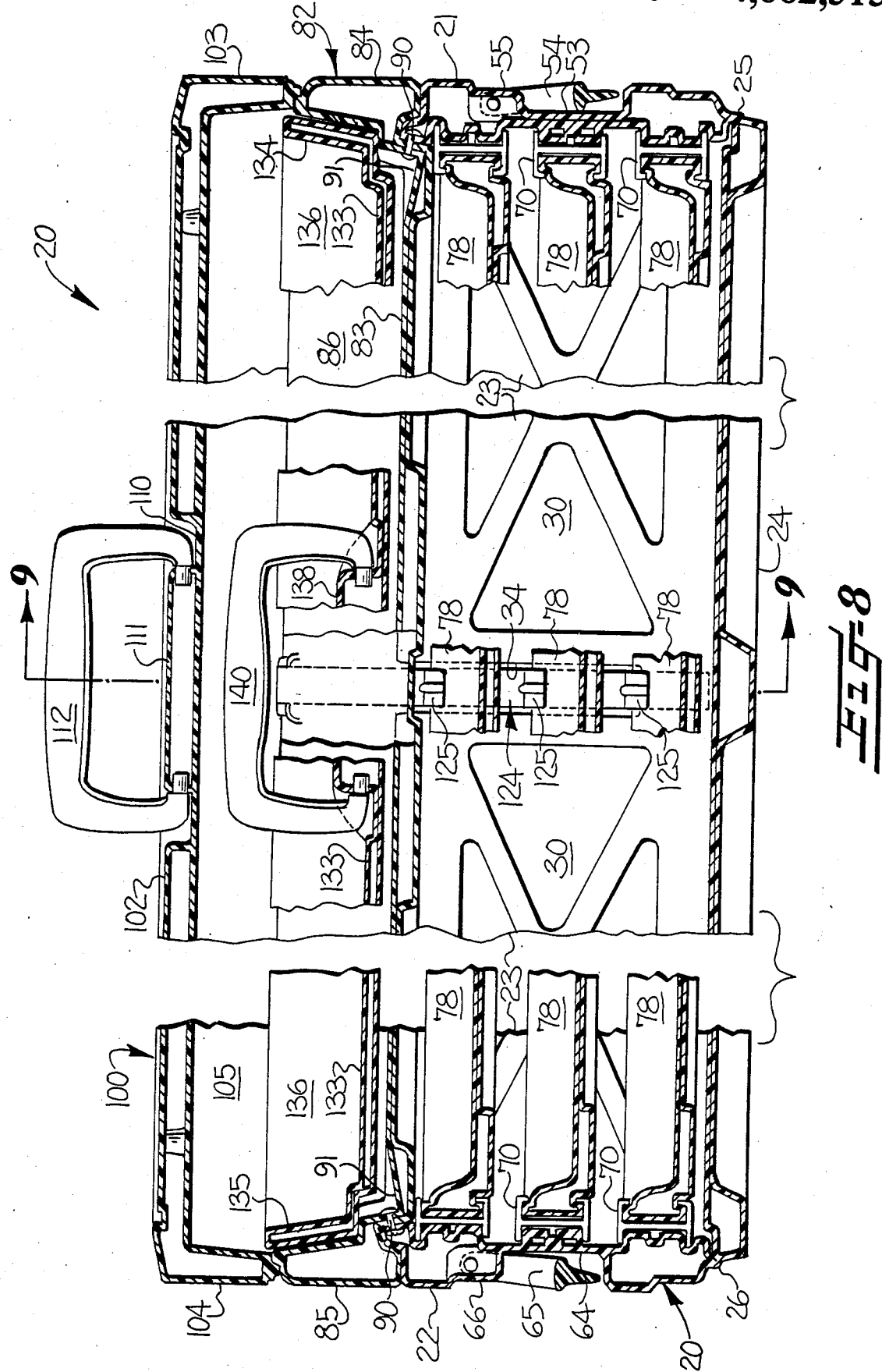

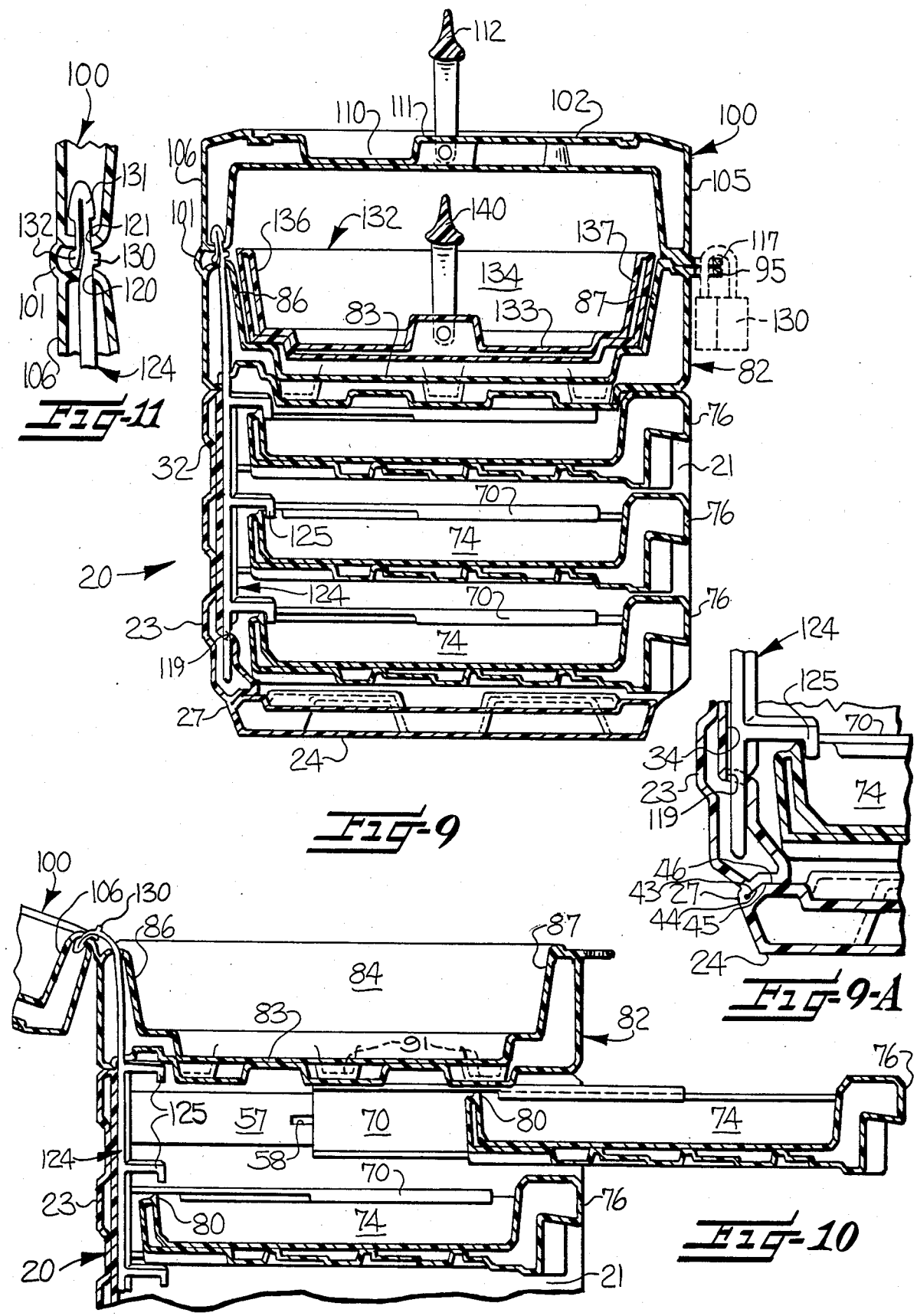

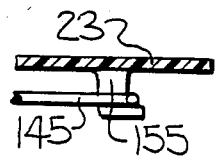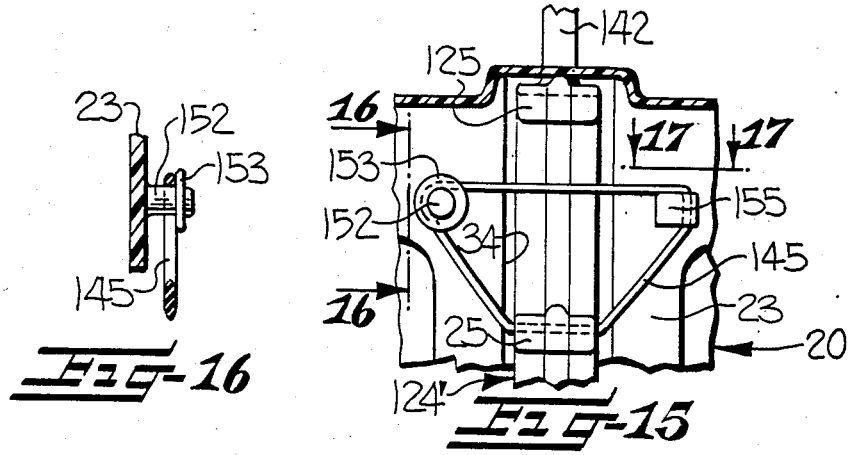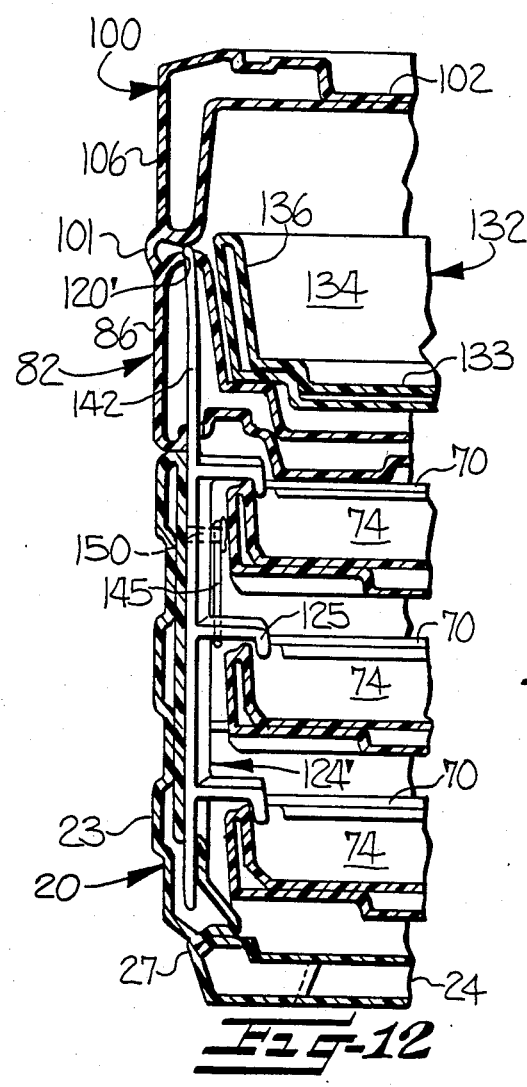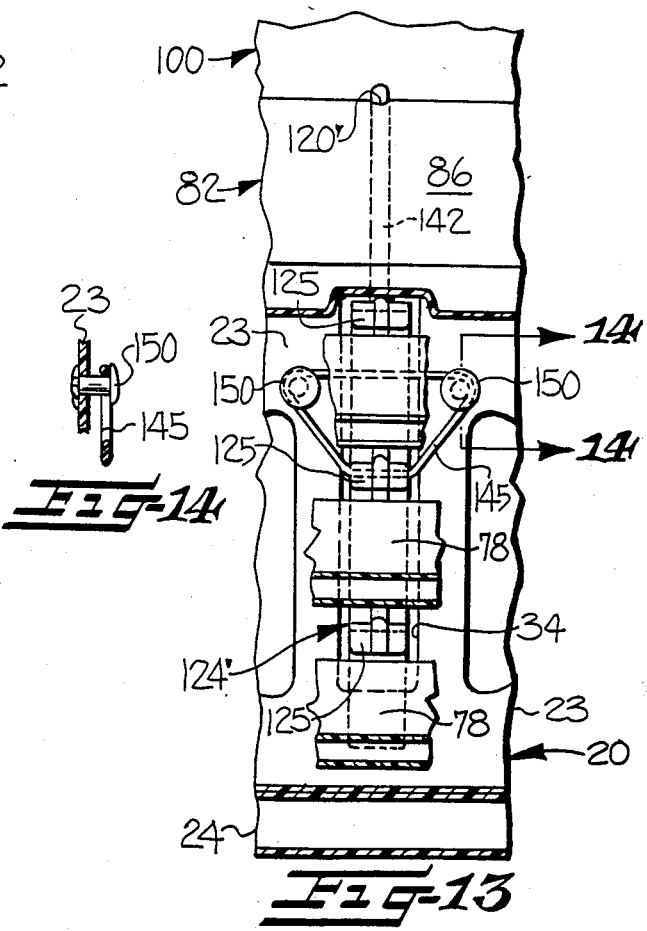

PLASTIC BLOW-MOLDED ARTICLES WITH FOLD-UP SIDES

FIELD OF THE INVENTION

This invention relates generally to a plastic blow-molded container and to a method of forming the same, and more particularly to a plastic blow-molded tool chest which includes a lower tool compartment that is initially blow-molded in a flat condition with side walls being simultaneously molded with and joined to a bottom wall by integral flexible plastic hinges so that the side walls can be raised up into right angular relationship with the bottom wall to form a lower tool compartment of hollow doublewall construction having a greater depth than has been possible to obtain in known types of blow-molded containers.

BACKGROUND OF THE INVENTION

It is generally known to form various types of plastic blow-molded containers with hollow double-wall construction. These known types of blow-molded containers are formed by positioning extruded plastic tubular material of oblong cross section, usually referred to as a parison, between spaced-apart and complimentary mold parts. One mold part is provided with cavities that form the exterior of the container while the other mold part is provided with cavities that form the interior of the container. When the mold parts are brought together, the parison is inflated so that opposed wall portions are forced into the cavities of the mold parts to provide the double-wall construction of the container. The wall portions of the parison are pinched together by areas of the mold parts so that the exterior and interior walls of the container are joined together around their peripheral edges.

In some cases, a single piece blow-molded container is formed in one operation by simultaneously molding the body of the container and the cover or lid in side-by-side relationship and with an integral flexible "living" hinge joining the body and cover or lid. Examples of these known types of plastic blow-molded containers are illustrated in U.S. Pat. Nos. 3,327,841; 3,339,781; 3,441,071; 3,452,125; 3,536,435; and 4,340,139.

The body of the containers formed in the manner illustrated in these patents has the side walls molded in a right angular relationship with the bottom wall and the side walls are integrally connected at the corners of the container. This method of blow molding the container body limits the height of the side walls and thereby limits the depth of the body of the container. The height of the side walls is limited because of the limitation of the depth of the cavity which can be formed in one mold part and the limitation of the corresponding protrusion which can be formed in the other mold part.

SUMMARY OF THE INVENTION

It is an object of the present invention to provide a plastic blow-molded container, such as a tool chest or the like, and a method of forming the same whereby conventional blow-molding equipment may be utilized to form a container having substantially greater depth than has been possible to obtain in the formation of unitary one-piece blow-molded containers produced in accordance with known blow-molding procedures.

The greater depth is achieved in accordance with the present invention by blow molding the main body portion of the container in a flat condition with side walls being simultaneously molded with and joined to a bottom wall by integral flexible plastic "living" hinges so that the side walls can be raised up into right angular relationship with the bottom wall to form a container having a depth of five or more inches.

In the tool chest embodiment of the invention illustrated and disclosed in the present application, the main body, initially blow molded in flat condition, forms a lower tool compartment which is provided with a plurality of drawers supported for sliding movement on ribs integrally formed on the inner sides of opposite side walls. The side walls of the lower tool compartment are maintained in upright position by a blow-molded auxiliary body which forms an upper tool compartment and is connected to the upper portions of the upwardly folded side walls of the lower tool compartment. The upper tool compartment may be simultaneously blow molded with a lid or cover and the upper tool compartment and the lid or cover are joined together by an integral flexible plastic "living" hinge. A blow-molded tool tray is provided to be removably positioned in the upper tool compartment. Drawer slide guides are provided for supporting the drawers in position on the integral ribs on the opposite side walls of the lower compartment. A lid-operated drawer locking device is supported for vertical sliding movement in the rear wall of the lower tool compartment and is operable to maintain the drawers in a closed position when the lid or cover is closed and to release the drawers so that they may be moved outwardly when the lid or cover is raised.

In one embodiment of the drawer locking device, the upper end of the drawer locking device is connected to the cover or lid and is raised when the cover is raised and lowered when the cover is lowered. In other embodiments of the drawer locking device, resilient means is provided for normally urging the drawer locking device upwardly while the lid or cover engages and lowers the drawer locking device when the cover is moved to a closed position.

BRIEF DESCRIPTION OF THE DRAWINGS

Other objects and advantages will appear as the description proceeds when taken in connection with the accompanying drawings, in which

FIG. 3 is an isometric view of the main body or lower compartment as it appears when removed from the blow-molding machine in a flat condition, with the side walls hingedly connected to the bottom wall;

FIG. 3-A is an enlarged fragmentary vertical sectional view showing the hinged connection between the rear and bottom walls;

FIG. 4 is an exploded isometric view of the tool chest and illustrating the manner in which the auxiliary body or upper tool compartment and integrally formed lid and cover are supported on the upper portions of the side walls of the lower tool compartment;

FIG. 5 is a view similar to FIG. 4 but showing one of the drawers in open position and illustrating the auxiliary body or upper tool compartment connected to the lower tool compartment;

FIG. 6 is an enlarged fragmentary horizontal sectional view through one corner of the lower tool compartment, being taken substantially along the line 6—6 in FIG. 4;

FIG. 7 is an enlarged vertical sectional view through the cover latch, being taken substantially along the line 7—7 in FIG. 1;

FIG. 8 is an enlarged longitudinal vertical sectional view taken substantially along the line 8—8 in FIG. 1 and with portions thereof being broken away;

FIG. 9 is a transverse vertical sectional view through the tool chest, being taken substantially along the line 9—9 in FIG. 8;

FIG. 9-A is an enlarged fragmentary view of the lower left-hand end of FIG. 9;

FIG. 10 is a view similar to the upper portion of FIG. 9 but illustrating the lid or cover in an open condition and the upper drawer being moved outwardly to an open position;

FIG. 11 is an enlarged sectional view illustrating the manner in which the upper end of the drawer locking device is attached to the cover;

FIG. 12 is a view similar to the left-hand portion of FIG. 9 but illustrating a different embodiment of a drawer locking device;

FIG. 13 is a fragmentary elevational view of a portion of the rear wall of the lower tool compartment and illustrating the manner in which the drawer locking device is supported for vertical sliding movement and urged upwardly by a resilient band;

FIG. 14 is an enlarged vertical sectional view taken substantially along the line 14—14 in FIG. 13;

FIG. 15 is a view similar to the upper portion of FIG. 13 but illustrating an alternate method of supporting the resilient band for urging the drawer locking device upwardly;

FIG. 16 is an enlarged vertical sectional view taken substantially along the line 16—16 in FIG. 15; and FIG. 17 is an enlarged horizontal sectional view taken substantially along the line 17—17 in FIG. 15.

DESCRIPTION OF THE ILLUSTRATED EMBODIMENT

Figure 1:
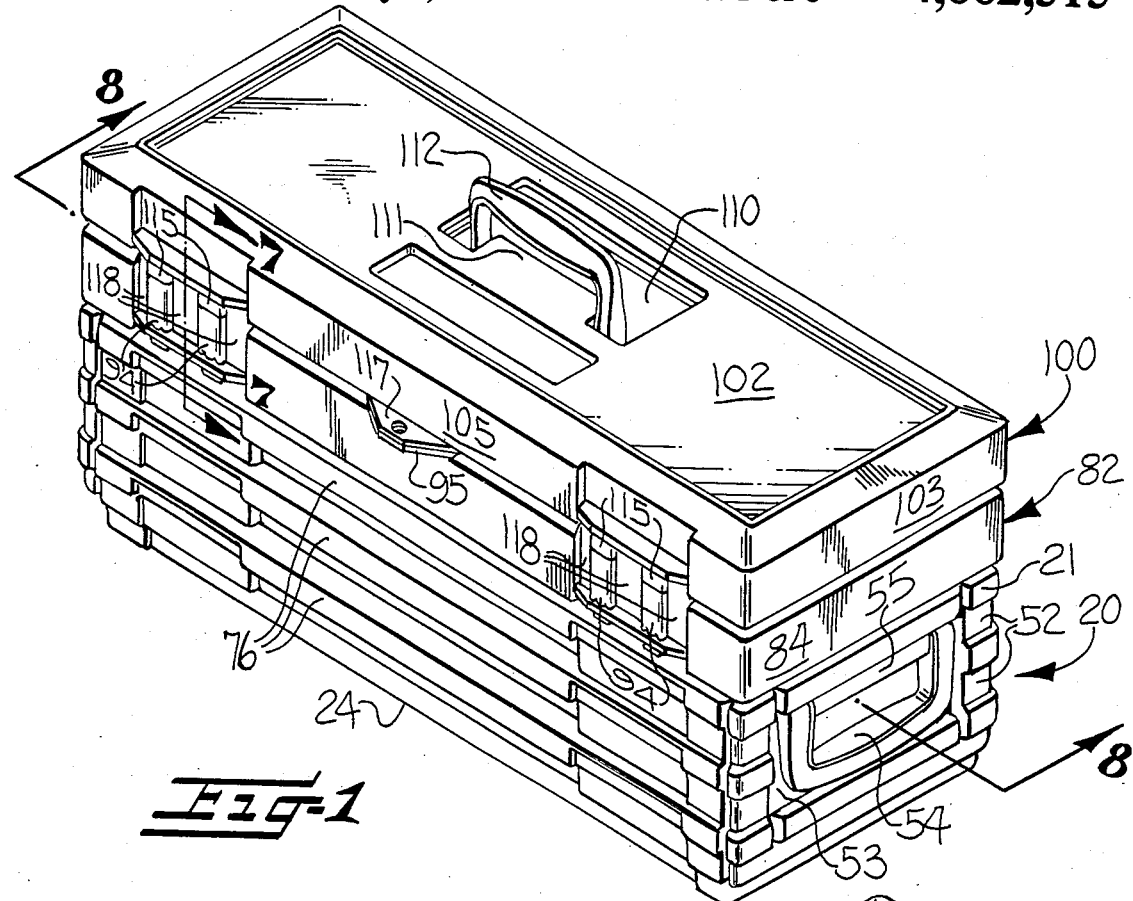
FIG. 1 is an isometric view showing the front, top and one side of a tool chest in accordance with the present invention.

The plastic blow-molded container of the present invention is illustrated in the form of a tool chest including upper and lower tool compartments with drawers slideably mounted in the lower tool compartment. However, it is to be understood that other types of containers may be formed in accordance with the present invention to provide a greater depth in the main body or compartment than has heretofore been possible to obtain in blow-molded containers.

As illustrated in the drawings, the plastic blow-molded tool chest generally includes a main body or lower tool compartment, broadly indicated at 20. As best illustrated in FIG. 3, the lower tool compartment is initially blow molded in a flat condition with opposite side walls 21, 22 and a rear wall 23 being simultaneously molded with and joined to a bottom wall 24 by respective integral flexible plastic "living" hinges 25, 26 and 27. The bottom wall 24, the side walls 21, 22, and the rear wall 23 are each blow molded of a hollow double-wall construction to provide interior and exterior walls on each of the bottom and side walls.

Figure 2:
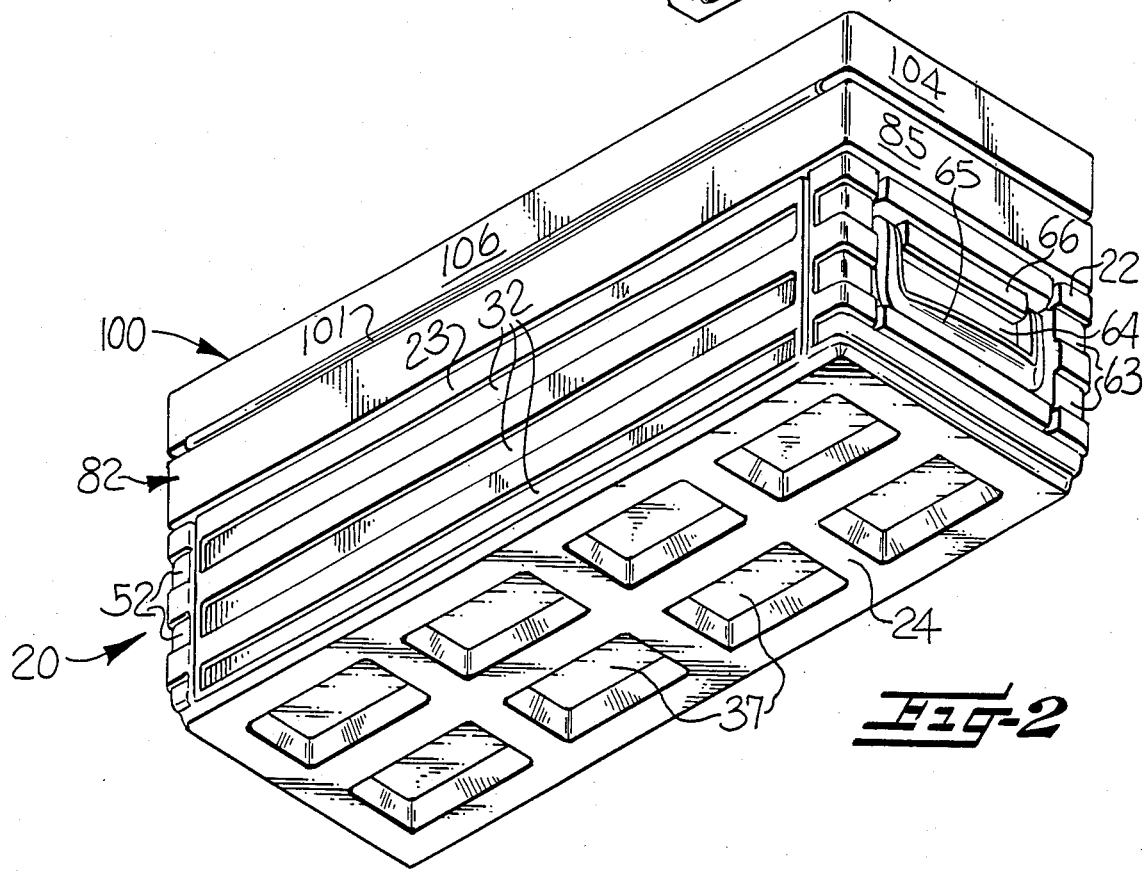
FIG. 2 is a view similar to FIG. 1 but showing the bottom, rear and other end of the tool chest.

As illustrated in FIG. 3, the interior wall of the rear wall 23 is provided with diamond-shaped depressed areas 30 so that portions of the interior wall contact the inner surface of the exterior wall. The exterior wall is provided with spaced-apart horizontally extending impressed areas 32 (FIG. 2) which form horizontally extending ribs along the rear wall 23 and cause the inner surface of the exterior wall to contact the inner surface of the interior wall. The impressed areas 30 and 32 on the interior and exterior walls of the rear wall 23 provide rigidity and strength to the rear wall 23. The medial portion of the interior wall of the rear wall 23 is pressed inwardly to form an operating slot 34 (FIG. 3) which provides a vertical guideway for reception of a drawer locking device, to be presently described.

The upper edge of the rear wall 23 is provided with an integrally molded lip 35 which extends upwardly therefrom and is adapted to mate with a corresponding lip on the upper tool compartment, in a manner to be presently described. Lip members 36 (FIG. 6) are integrally formed on opposite ends of the rear wall 23 and are adapted to mate with locking lips on the corresponding end walls 21, 22, in a manner to be presently described.

The exterior wall of the bottom wall is provided with inwardly extending depressed areas 37 (FIG. 2) so that the exterior wall contacts and presses against certain raised areas 40 (FIGS. 3 and 4) of the interior wall of the bottom wall 24. The depressed areas 37 of the exterior wall of the bottom wall 24, and the raised areas 40 of the interior wall of the bottom wall 24 add strength and rigidity to the bottom wall.

As best illustrated in FIG. 3-A, the areas extending parallel to the living hinge 27 on the interior walls of the bottom wall 24 and the rear wall 23 are molded with outwardly diverging respective bevel wall areas 43, 44 and respective vertical and horizontal ledge portions 45, 46. The corresponding portions adjacent the hinges 25, 26, connecting the end wall 21 to the bottom wall 24 and the end wall 22 to the opposite end of the bottom wall 24, are also provided with the same type of bevel wall areas and vertical and horizontal ledge portions. When the rear wall 23 is raised upwardly to right angular position relative to the bottom wall 24, as illustrated in FIG. 9-A, the ledge portion 45 of the rear wall 23 is moved to a horizontal position and is firmly positioned on the ledge portion 46 of the bottom wall 24.

Thus, the hinge 27 is not subjected to any weight causing downward pressure on the rear wall 24, or any upward pressure or shock should the tool chest be dropped. The hinge 27 merely acts to keep the rear wall 23 in proper vertical alignment above the rear edge portion of the bottom wall 24. Any pressure applied downwardly on the rear wall 23 is absorbed by the ledge portion 45 engaging the ledge portion 46. The rear edges of the end walls 21, 22 are provided with an integrally formed and inwardly extending locking lip 50 (FIGS. 3 and 6) which mates with and engages the corresponding lips 36 on the rear wall 23, when the rear wall 23 is raised to the perpendicular position and the end walls 21, 22 are raised to the perpendicular position, as shown in FIG. 4.

The exterior wall of the end wall 21 is provided with impressed horizontal areas 52 (FIG. 1) which provide a continuation of the horizontal ribs formed on the rear wall 23 by the impressions 32. The central portion of the exterior wall of the end wall 23 is provided with an impressed central area 53 which provides a seat for a lifting handle 54. The lifting handle 54 is provided with inwardly extending pins which engage corresponding holes drilled in a handle support protrusion 55 integrally formed in the exterior wall of the end wall 21. The upper edge of the end wall 21 is provided with an upstanding lip 56 (FIGS. 3, 4 and 8), adapted to mate with a corresponding groove formed in the upper tool compartment, in a manner to be presently described. The interior wall of the end wall 21 is provided with integrally molded inwardly extending drawer slide support ribs 57 in spaced-apart relationship thereon. As illustrated in FIG. 3, three inwardly extending drawer slide support ribs 57 are provided on the interior wall of the end wall 21. Each of the drawer slide support ribs 57 is provided with an integrally molded groove 58, for purposes to be presently described.

The end wall 22 is also provided with an upstanding lip 60 (FIGS. 3, 4 and 8) which is adapted to mate with a corresponding groove in the upper tool compartment, in a manner to be presently described. The end wall 22 also has inwardly extending drawer slide support ribs 61 integrally molded with the interior wall thereof (FIG. 3). Each of the drawer support ribs 61 also includes a guide groove 62 molded therein, for purposes to be presently described. The exterior wall of the end wall 22 is provided with impressed horizontal areas 63 (FIG. 2) to provide ribs aligned with the ribs extending across the rear wall 23. A handle housing impression 64 is formed in the exterior wall of the end wall 22 (FIG. 2) for housing a handle 65. The handle 65 is supported for pivotal movement on pins positioned in bores in a handle support protrusion 66 integrally formed in the handle impression 64.

Plastic drawer slides 70, 71, which are shaped like an I-beam in cross section, are supported with their upper and lower flanges in sliding engagement with the integrally formed ribs 57, 61 on the interior walls of the end walls 21, 22. Each of the drawer slides 70, 71 (FIG. 4) is provided with a spring tongue having a latch cam 72 on the inner end thereof. The latch cam 72 limits the forward and rearward sliding movement of the drawer slides 70, 71 by riding in the corresponding grooves 58, 62 formed in the respective ribs 57, 61. The forward end portion of the upper and lower flanges of each of the drawer slides 70, 71 is provided with inwardly extending lips which slideably engage ribs or runners formed on the upper and lower edges of the end walls 74, 75 of a blow-molded hollow double-wall construction drawer 76.

As shown in FIGS. 9 and 10, the exterior wall of the bottom wall 77 of the drawer 76 is provided with integrally formed ribs for reinforcing the same and providing rigidity thereto. The drawer slides 70, 71 permit any of the drawers 76 to be withdrawn, or opened to the position of the top drawer, as shown in FIGS. 5 and 10. The rear wall 78 of the drawer 76 is provided with an integrally molded locking stop 80 (FIG. 4) which is adapted to be engaged by a drawer locking device, in a manner to be presently described.

A unitary one-piece upper tool compartment, broadly indicated at 82, is formed of blow-molded hollow double-wall construction and includes a bottom wall 83, and a pair of upstanding opposite side walls 84, 85. An upstanding rear wall 86 is integrally joined to the rear ends of the opposite side walls 84, 85, and an upstanding front wall 87 is integrally joined at opposite ends to the forward ends of the opposite side walls 84, 85. The upstanding walls 84–86 are aligned above the corresponding side walls 21, 22 and the rear wall 23 of the lower tool compartment 20 and a lower peripheral groove is formed in the upper tool compartment 82 to receive the upstanding locking ribs 56, 60 and 35 of the respective end walls 21, 22 and the rear wall 23.

When the side and rear walls of the lower compartment 20 are raised upwardly to right-angular relationship with the bottom wall 24, as illustrated in FIG. 4, the upper compartment 82 is fixed thereto by any suitable means. In the drawings, the upper compartment 82 is illustrated as being fixed to the lower compartment 20 by blind rivets 90 (FIG. 8) which are mounted in holes drilled into integral depressions 91 (FIG. 4) formed along the juncture of the side and rear walls 84, 85 and 86 with the bottom wall 83 of the upper compartment 82. As illustrated in FIG. 8, the blind rivets 90 extend through the interior and exterior walls of the upper compartment 82 and through the interior wall of the corresponding locking lips 56, 60 and 35 of the respective end walls 21, 22 and rear wall 23 to securely connect the upper compartment 82 to the lower compartment 20 and to maintain the interlocked corners of the side walls 21, 22 in position with the rear wall 23.

As illustrated in FIG. 4, the front wall 87 of the upper compartment 82 has latch locking members 94 integrally molded with the exterior wall. A horizontally extending locking plate 95 is also integrally molded with the upper edge portion of the front wall 87 of the upper compartment 82, for purposes to be presently described. The upper surface of the upper walls of the upper compartment 82 is provided with an integrally molded sealing lip 96.

A unitary one-piece lid or cover, broadly indicated at 100, of blow-molded double-wall construction is hingedly connected to the rear wall of the upper compartment 82. It is preferred that the lid 100 be integrally blow molded with the upper compartment 82 and joined thereto by a living hinge 101 formed during the blow molding process. The cover or lid 100 includes a top wall 102, integrally formed opposite side walls 103, 104 and front and rear walls 105, 106. As illustrated in FIG. 1, the exterior wall of the upper wall 102 of the lid 100 is provided with suitable impressions including a handle receiving impression 110 having a handle support boss 111 integrally formed therewith, and in which opposite end pivot pins of a handle 112 are supported.

Latch support bosses 115 (FIG. 7) are integrally molded with the lower edge portion of the front wall 102 and are aligned above the latch locking members 94 on the upper compartment 82. The bosses 115 support the upper end portions of a pair of spaced-apart plastic molded flexible latch members 118. The lower end portions of the latch members 118 are provided with locking lips for engaging the lower edge portions of the latch locking members 94 when the cover or lid 100 is in the closed position, as illustrated in FIG. 1. A horizontally extending locking plate 117 is integrally molded with the lower edge portion of the front wall 105 of the cover 100.

After completion of the molding of the lower compartment 20, and the integral molding of the upper compartment 82 and the lid 100, a rectangular slot 119 (FIG. 4) is routed in the lower end of the drawer locking device slot 34 in the rear wall 23 for slideably receiving the lower end of a drawer locking device to be presently described. Also, a rectangular slot, indicated at 120 in FIG. 4, is formed downwardly through the upper and lower edges of the rear wall 86 of the upper compartment 82. A rectangular slot, indicated at 121 in FIG. 4, is formed in the lower portion of the rear wall 106 of the cover 100 for mounting the upper end of the drawer locking device.

As illustrated in FIGS. 8, 9 and 11, the drawer locking device, broadly indicated at 124, is formed of molded plastic material and includes spaced-apart forwardly extending and downwardly hooked locking fingers 125. The flat slide portion of the locking device 124 extending below the lower locking finger 125 extends through the slot 119 in the lower end of the guide slot 34 and is supported for vertical movement therein. The upper flat portion of the drawer locking device 124 extending above the upper locking finger 125 is slideably supported in the rectangular guide slots 120 in the upper and lower edges of the rear wall 86 of the upper compartment 82. The upper end portion of the drawer locking device 124 (FIG. 11) is initially molded in a straight condition with cam members 130, 131 and 132 on one side, and with a fold hinge being formed in the medial portion of the cam member 131. The upper end of the drawer locking device 124 is connected to the rear wall 106 of the cover 100 in a manner to be presently described.

To assemble the tool chest, the initially flat molded lower compartment 20, as illustrated in FIG. 3, is positioned as shown in FIG. 4 with the side walls 21, 22 and the rear wall 23 in upright condition. The lower end of the drawer latching device 124 is positioned in the rectangular slot 119 in the lower end of the guide slot 34 in the rear wall 23 with the upper end in an upstanding position. The upper tool compartment 82 is then positioned on the upper ends of the side and rear walls of the lower compartment 20 while the upper end of the drawer locking device 124 passes upwardly through the rectangular guide slots 120 in the rear wall 86 of the upper compartment 82. Holes are drilled and the blind rivets 90 are installed in the impressions 91 to connect and securely fasten the upper compartment 82 to the lower compartment 20.

The upper end portion of the drawer locking device 124 is folded over on itself in the medial portion of the cam member 131, as illustrated in FIG. 11, and the folded end is forceably inserted in the rectangular slot 121 in the cover 100 with the cam members 130, 132 positioned between the cover 100 and the upper tool compartment 82. The drawer locking device 124 thus is connected to the cover 100 at its upper end so that it is lowered into drawer locking position, as shown in FIG. 9, when the cover 100 is closed. Also, the drawer locking device 124 is raised upwardly when the cover 100 is moved to the open position, as shown in FIG. 10, to release the drawers 76 for sliding movement.

After the upper tool compartment 82 is secured to the lower compartment 20 by the blind rivets 90, and the drawer latching device 124 is supported for vertical sliding movement with raising and lowering of the cover 100, the end handles 54, 65 are installed and the upper lifting handle 112 is connected to the cover 100. The latch members 118 are then connected to the cover 100 and the drawer guides 70, 71 are slideably mounted on opposite ends of the drawers 76. The drawers 76 are inserted into sliding position by moving the inner ends of the drawer guides 70, 71 onto the integrally formed ribs 57, 61 on the corresponding opposite side walls 21, 22 of the lower compartment 20. The cams 72 on the spring tongue slide in the corresponding grooves 58, 62 of the respective ribs 57, 61 and prevent accidental removal of the drawers 76.

With the cover 100 in a closed position, as shown in FIG. 9, the drawer locking device 124 is moved downwardly to the locking position to hold the drawers 76 in position in the lower compartment 20. If desired, a lock, as shown in dotted lines at 130 in FIG. 9, can be placed through the openings in the locking plates 95 and 117 to lock the cover 100 in closed position.

A unitary one-piece removable tool tray, broadly indicated at 132 (FIGS. 5 and 9), is formed of blow-molded hollow double-wall construction and includes a bottom wall 133, and a pair of upstanding opposite side walls 134, 135. An upstanding rear wall 136 is integrally joined to the rear ends of the opposite side walls 134, 135 and an upstanding front wall 137 is integrally joined at opposite ends to the forward ends of the opposite side walls 134, 135. The interior wall of the bottom wall 133 is provided with an upstanding boss 138 in which a lifting handle 140 is supported at opposite ends thereof. The removable tool tray 132 is shaped to fit into and nest in the upper tool compartment 82, as shown in FIGS. 8 and 9. The tool tray 132 may be easily removed and replaced by lifting the handle 140 and the upstanding handle 140 will not engage the cover 100 when closed, as shown in FIG. 9.

Alternate forms of a drawer locking device 124' are shown in FIGS. 12-17. The alternate drawer locking device 124' is very similar to the drawer locking device 124 except that its upper end is not attached to the cover or lid 100. The lower end portion of the drawer locking device 124' is supported for vertical sliding movement in the guide slot 34 provided in the interior wall of the rear wall 23 of the lower tool compartment 20 and includes forwardly extending drawer locking fingers 125' which move downwardly into locking engagement with the rear wall 78 of the drawers 76 when the locking device 124' is in the lower position, as shown in FIG. 12. The upper end of the locking device 124' is provided with an integrally formed round operating rod 142 (FIG. 13) and the upper end is engaged by the rear wall 106 of the cover 100 when in closed position. The operating rod 142 is supported for vertical sliding movement in holes drilled in the lower and upper edges of the rear wall 86 of the upper tool compartment 82.

Resilient means is provided for normally urging the drawer locking device 124' upwardly to the unlocked position. This resilient means is illustrated in FIGS. 12-17 in the form of a stretchable band 145, the medial portion of which extends beneath the medial locking finger 125' (FIG. 13). The stretchable band is shown in the form of a synthetic rubber O-ring. The upper end portions of the O-ring 145 are supported in spaced-apart relationship on support means attached to the interior wall of the rear wall 23. FIGS. 13 and 14 illustrate the O-ring 145 being attached and supported in spaced-apart relationship on shouldered blind rivets 150 supported in bores in the interior wall of the rear wall 123 of the lower tool compartment 20.

FIGS. 15-17 illustrate alternate support means for the upper portion of the O-ring 145. As illustrated in FIGS. 15 and 16, the left-hand portion of the O-ring is supported on an integrally formed stud 152 molded with and extending inwardly from the interior wall of the rear wall 23. The inner portion of the stud 152 is provided with a plastic washer 153 which is press fitted on the stud 152 to retain the O-ring 145 in position on the stud 152, as illustrated in FIG. 16.

The right-hand portion of the O-ring 145 is supported on an integrally molded boss 155 which extends inwardly from the interior wall of the rear wall 23 and is then provided with a slot extending down the right-hand portion thereof for receiving the O-ring therein and retaining the same on the boss 155, as illustrated in FIG. 17. It is to be understood that the upper portion of the O-ring may be supported on both the left-hand and right-hand sides by the stud 152 and washer 153, as illustrated in FIG. 16. Also, both the right and lefthand sides of the O-ring 145 can be supported by a boss 155, in the manner illustrated in FIG. 17.

To install the alternate locking device 124', the lower end of the locking device is positioned in the slot formed in the lower end of the operating slot 34 and the upper operating rod 142 extends through the bores in the upper tool compartment 82 as this element is moved downwardly and then secured to the lower tool compartment 20. Thus, when the lid or cover 100 is raised, the alternate drawer locking device 124' is urged upwardly to the unlocked position by the O-ring 145. When the lid or cover 100 is closed, as illustrated in FIG. 12, the upper end of the operating rod 142 is engaged and lowered by the lower edge of the rear wall 106 to move the locking fingers 125' into engagement with the rear walls 78 of the drawers 76 and retain the same in the closed position.

The plastic blow-molded container of the present invention includes a lower tool compartment of hollow double-wall construction which may be provided with a much greater depth than prior known types of blow-molded containers. The additional depth in the lower tool compartment is obtained by initially blow molding the lower tool compartment in a flat condition with the side walls being simultaneously molded with and joined to the bottom wall by integral flexible plastic "living" hinges so that the side walls can be raised up into right angular relationship with the bottom wall. While the plastic living hinges are necessary to connect together the bottom wall and the side walls, the adjacent portions of the side walls and the bottom walls are formed with support ledges which rigidly support the side walls on the bottom wall so that any downward force applied to the side walls is not transmitted to the living hinges but is absorbed by the support ledges. The living hinges merely maintain the side walls in right angular relationship with the bottom wall and maintain the support ledges in engagement with each other. While the plastic blow-molded container of the present invention is illustrated in the form of a tool chest, it is to be understood that other types of plastic blow-molded containers can be constructed in accordance with the present invention.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A plastic blow-molded container including a deep wall compartment of blow molded hollow double-wall construction and comprising
   (1) a bottom walls,
   (2) a rear wall,
   (3) opposite side walls,
   (4) integrally formed hinge means joined one side of each of said rear and side walls to the corresponding sides of said bottom wall so that said rear and side walls can be moved into upstanding right angular position relative to said bottom wall, and
   (5) means maintaining said rear and side walls in upstanding right angular position relative to said bottom wall, said means comprising a unitary one-piece upper compartment of blow-molded hollow wall construction which includes
      (a) a pair of upstanding opposite walls aligned above said opposite side walls of said deep wall compartment,
      (b) an upstanding rear wall jointed to said opposite side walls and aligned above said rear wall of said deep wall compartment,
      (c) an upstanding front wall joined to said opposite side walls of said deep wall compartment, and
      (d) means connecting said upper compartment to the upper ends of said rear and opposite side walls of said deep wall compartment.

2. A blow-molded container according to claim 1 including a unitary one-piece lid of blow-molded doublewall construction and comprising
   (1) a top wall,
   (2) opposite side walls joined to said top wall and extending downwardly therefrom,
   (3) a rear wall joined to said top wall and said side walls and extending downwardly from said top wall,
   (4) a front wall joined to said top wall and said side walls and extending downwardly from said top wall, and
   (5) living hinge means connecting the lower edge of said rear wall of said lid to the upper edge of said rear wall of said upper compartment.

3. A plastic blow molded container according to claim 2 including latch means releasably connecting said front wall of said lid to said front wall of said upper compartment.

4. A plastic tool chest or the like comprising the combination of:
   (a) a lower tool compartment of blow-molded hollow double-wall construction and including
      (1) a bottom wall,
      (2) a rear wall,
      (3) opposite side walls including inner sides with integrally molded inwardly extending ribs in spaced-apart relationship,
      (4) integrally formed hinge means joining one side of each of said rear and side walls to the corresponding sides of said bottom wall so that said rear and side walls may be moved into upstanding right angular position relative to said bottom wall, and
      (5) a plurality of drawers supported for sliding movement by said ribs formed on the inner sides of said opposite side walls,
   (b) a unitary one-piece upper tool compartment of blow-molded hollow double-wall construction and including
      (1) a bottom wall,
      (2) a pair of upstanding opposite side walls aligned above said opposite side walls of said lower tool compartment,
      (3) an upstanding rear wall joined to said opposite side walls and aligned above said rear wall of said lower tool compartment, and
      (4) an upstanding front wall joined to said opposite side walls and extending above said drawers, (c) means securing said rear and opposite side walls of said upper tool compartment to the upper ends of said rear and opposite side walls of said lower tool compartment, and (d) a unitary one-piece lid of blow-molded double-wall construction adapted to cover said upper tool compartment and including (1) a top wall, (2) opposite side walls joined to said top wall and extending downwardly therefrom, (3) a rear wall joined to said top wall and said side walls and extending downwardly from said top wall, (4) a front wall joined to said top wall and said side walls and extending downwardly from said top wall, and (5) living hinge means connecting the lower edge of said rear wall to the upper edge of said rear wall of said upper tool compartment.

5. A plastic tool chest according to claim 4 including latch means releasably connecting said front wall of said lid to said front wall of said upper tool compartment.

6. A plastic tool chest according to claim 4 including integrally molded support ledges on each of said side, rear and bottom walls of said lower tool compartment, said support ledges being positioned adjacent said hinge means so that said support ledges of said side and rear walls engage said support ledges of said bottom wall when said side and rear walls are in upstanding right angular position relative to said bottom wall.

7. A plastic tool chest according to claim 4, including lifting handle means supported on each of said side walls of said lower tool compartment.

8. A plastic tool chest according to claim 4 including lifting handle means supported on said unitary one-piece lid.

9. A plastic tool chest according to claim 4 including a removable tool tray positioned in said upper tool compartment and beneath said lid.

10. A plastic tool chest according to claim 9 including lifting handle means supported on said removable tool tray.

11. A plastic tool chest according to claim 4 including a drawer locking device supported for vertical movement on said rear wall of said lower tool compartment and being movable into locking engagement with said drawers when in a lower position.

12. A plastic tool chest according to claim 11 including means securing the upper end of said drawer locking device to said lid so that said drawer locking device is raised when said lid is raised, and so that said drawer locking device is lowered when said lid is lowered.

13. A plastic tool chest according to claim 11 including resilient means associated with said drawer locking device for normally raising said drawer locking device when said lid is raised, and an operating rod on the upper end of said drawer locking device, said operating rod being engaged by said lid to lower the same when said lid is lowered.

14. A plastic tool chest according to claim 13 wherein said resilient means comprises a stretchable band in engagement with said drawer locking device, and support means fixed on said rear wall of said lower tool compartment and supporting said stretchable band thereon.

15. A plastic tool chest according to claim 14 wherein said stretchable band comprises a synthetic rubber O-ring.

16. A plastic tool chest according to claim 14 wherein said support means for said stretchable band comprises shouldered blind rivets fixed in the interior wall of said rear wall and adjacent opposite sides of said drawer locking device.

17. A plastic tool chest according to claim 14 wherein said support means for said stretchable band comprises at least one stud integrally molded with the interior wall of said rear wall and extending inwardly therefrom, and a washer fixed on the inner end of said stud to provide a seat for retaining said stretchable band on said stud.

18. A plastic tool chest according to claim 14 wherein said support means for said stretchable band comprises at least one boss integrally molded with the interior wall of said rear wall and extending inwardly therefrom, and a slot cut in said boss to provide a seat for retaining said stretchable band on said boss.

19. A plastic tool chest according to claim 4 including molded plastic drawer slides having inner ends supported for sliding movement on said integrally molded ribs on the inner sides of said opposite side walls of said lower tool compartment, and said drawer slides having outer ends slideably supported on opposite sides of said drawers.

20. A plastic tool chest according to claim 19 including guide grooves extending along the medial portions of said integrally molded ribs, and a latch cam on each of said drawer slides, said latch cams each extending into a corresponding guide groove and serving to limit sliding movement of said drawer slides on said integrally molded ribs.

21. A plastic tool chest according to claim 20 including a spring tongue on each of said drawer slides, and wherein said latch cams are supported on said spring tongues so that said latch cams can be moved out of said guide grooves by moving said spring tongues.

* * * * *

UNITED STATES PATENT AND TRADEMARK OFFICE
CERTIFICATE OF CORRECTION

PATENT NO. : 4,662,515
DATED : 5 May 1987
INVENTOR(S) : John Parks Newby, Sr.

It is certified that error appears in the above-identified patent and that said Letters Patent is hereby corrected as shown below:

Column 9, Line 63, "walls" should read --wall--.

Column 9, Line 66, "joined" should read --joining--.

Column 10, Line 11, "jointed" should read --joined--.

Column 10, Line 15, "side walls of" should read --side walls and extending between said side walls of--.

Signed and Sealed this

Seventeenth Day of October, 1989

Attest:

DONALD J. QUIGG

Attesting Officer

Commissioner of Patents and Trademarks